(12) United States Patent
Visser et al.

(10) Patent No.: US 6,478,668 B2
(45) Date of Patent: Nov. 12, 2002

(54) APPARATUS FOR CONVEYING SLAUGHTERED ANIMALS

(75) Inventors: Dirk Visser; Erik Nolten, both of Ae Oostzaan (NL)

(73) Assignee: Meyn Food Processing Technology B.V., Oostzaan (NL)

(*) Notice: Subject to any disclaimer, the term of this patent is extended or adjusted under 35 U.S.C. 154(b) by 0 days.

(21) Appl. No.: 09/725,334

(22) Filed: Nov. 29, 2000

(65) Prior Publication Data

US 2002/0009967 A1 Jan. 24, 2002

(30) Foreign Application Priority Data

Nov. 30, 1999 (NL) ................................. 1013697

(51) Int. Cl.[7] .......................... A22B 7/00; A22C 18/00; A22C 21/00; A22C 25/12
(52) U.S. Cl. ........................................ 452/179; 452/177
(58) Field of Search .................. 452/179, 177, 452/178, 180, 182, 183, 184, 181

(56) References Cited

U.S. PATENT DOCUMENTS

| | | |
|---|---|---|
| 2,557,707 A | 6/1951 | Utter |
| 3,811,555 A | 5/1974 | Scheier et al. |
| 4,266,322 A | 5/1981 | van Mil |
| 4,619,017 A | 10/1986 | Simmons |
| 4,689,855 A | 9/1987 | Dameron |
| 5,026,317 A | 6/1991 | Kennedy |

FOREIGN PATENT DOCUMENTS

WO   WO 9313671 A   7/1993

OTHER PUBLICATIONS

EPO Search Report dated Jun. 28, 2000.

*Primary Examiner*—Charles T. Jordan
*Assistant Examiner*—Judith A. Nelson
(74) *Attorney, Agent, or Firm*—Dority & Manning

(57) ABSTRACT

The invention relates to an apparatus for conveying slaughtered animals, in particular birds or parts of birds, which apparatus includes a plurality of carriers for the animals, each of which carrier is connected via an adjustable coupling device with a conveyor, and which travel a path passing at least one inspection or processing station. During operation of the conveyor, each carrier at a predetermined position in the conveyor's path is rotatable about a substantially vertical axis by adjusting the coupling device via at least one operating unit positioned along the path, and wherein along the conveyor's path there is at least one guide member provided which is capable, after the carrier is rotated to a predetermined position, of moving the animal suspended from the carrier such that it is diverted around the processing station. Each carrier possesses at least one arm extending substantially sideways, and in that the guide member is equipped to cooperate with the arm when, as a result of the carrier's rotation to the predetermined position, the arm is placed at right angles to the conveyor's path of travel.

9 Claims, 3 Drawing Sheets

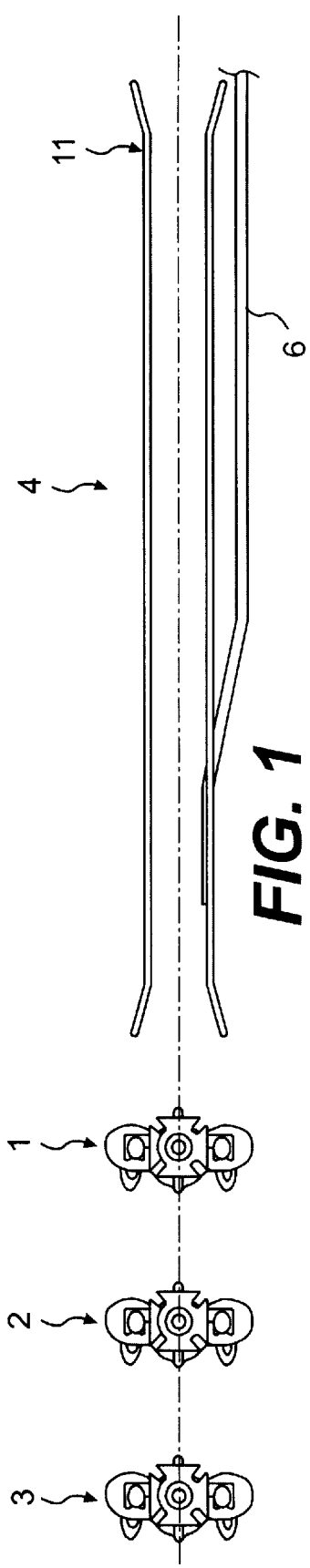
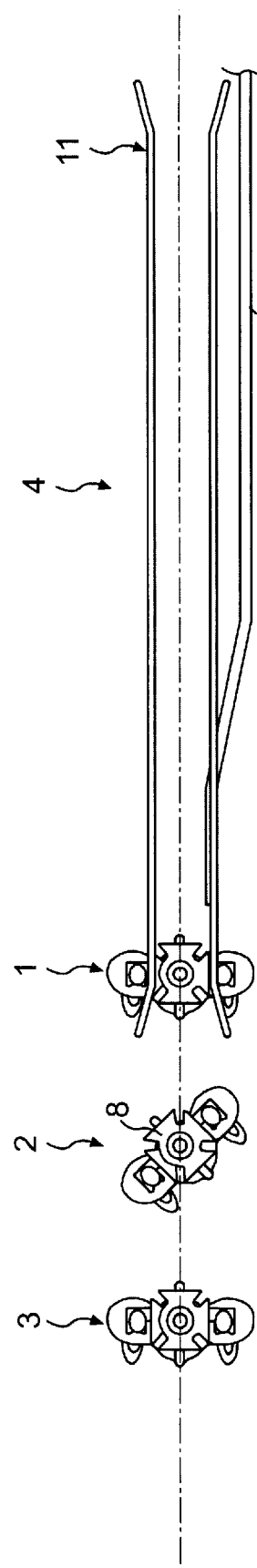
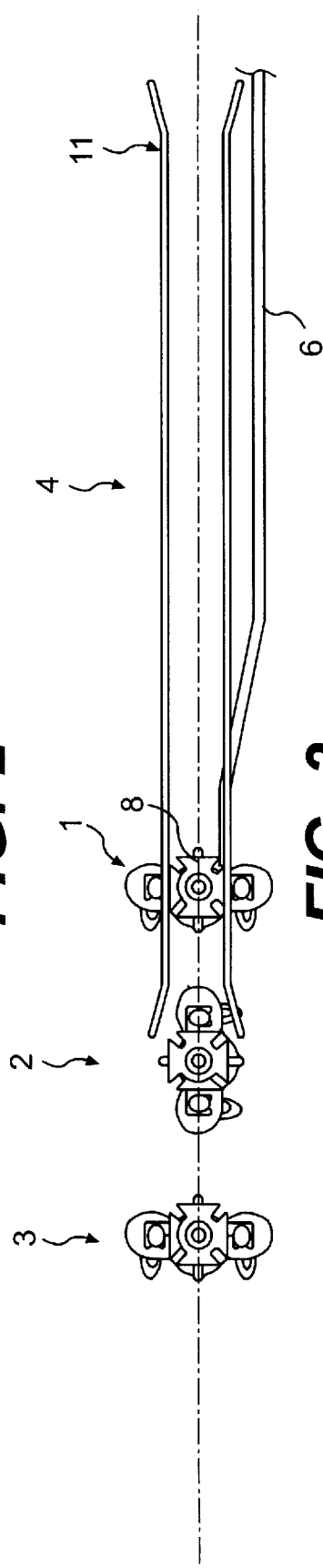

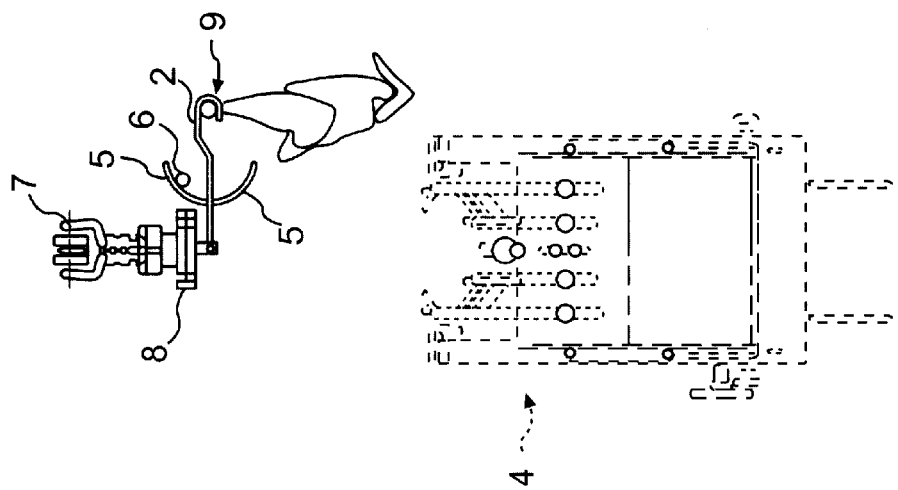
FIG. 8
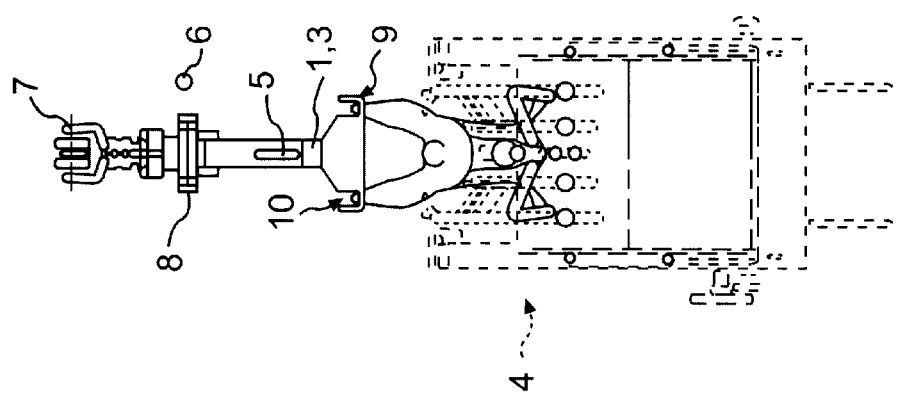
FIG. 7
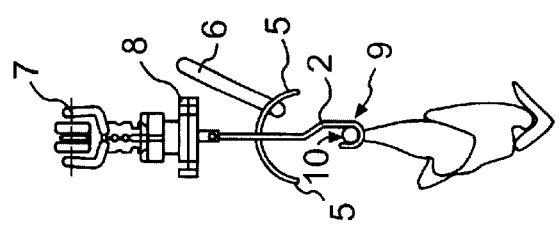
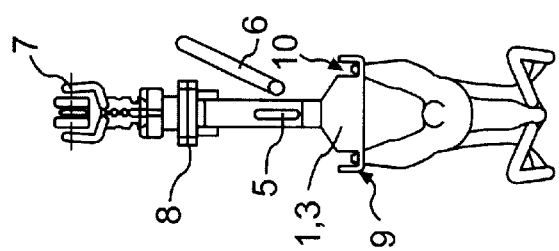
FIG. 6A    FIG. 6B

APPARATUS FOR CONVEYING SLAUGHTERED ANIMALS

BACKGROUND

The invention relates to an apparatus for conveying slaughtered animals, in particular birds or parts of birds, which apparatus comprises a plurality of carriers for the animals. Each carrier is connected via adjustable coupling means with a conveyor, and each carrier travels a path passing at least one inspection or processing station. During operation of the conveyor, each carrier at a predetermined position in the conveyor's path is rotatable about a substantially vertical axis by means of adjusting the coupling means via at least one operating unit positioned along the path. Along the conveyor's path, there is at least one guide member provided which is capable, after the carrier is rotated to a predetermined position, of moving the animal suspended from the carrier such that it is diverted around the processing station.

Such an apparatus is disclosed in the international patent application WO 93/13671 (PCT/NL93/00016). A problem with the known apparatus is that an animal which after inspection is found to be unsuitable for processing the in the processing station, is brought outside the path of the conveyor and the processing station through contact with the guide member. For hygienic reasons, this direct contact between the guide member and the respective animal is undesirable.

Another problem is that in order to allow the animal to circumvent the processing station, the carrier in the prior art is eccentric, which limits the speed at which the carrier with the suspended animal can be rotated to the predetermined position for guiding the animal around the processing station. This speed limit is unfavorable and has a limiting effect regarding the conveyance speed of the slaughtered animals in the apparatus, resulting in an undesirable limitation to the performance.

SUMMARY

It is a particular object of the invention to embody the apparatus such as to solve the problems noted above. An additional objective is to provide further advantages which will be explained hereinbelow or may be obvious from the description, or may be learned through practice of the invention.

The apparatus according to the invention is characterized in that each carrier possesses at least one arm extending substantially sideways, and in that the guide member is equipped to cooperate with the arm when, as a result of the carrier's rotation to the predetermined position, the arm is placed at right angles to the conveyor's path of travel. This is a very simple manner for providing a hygienic means to avoid that an animal is being processed in the processing station.

A further advantage of the invention is that the carrier for each animal may be carried out substantially rotation-symmetrically so that, if desired, the carrier can very quickly be rotated to the predetermined position so that the cooperation between the arm, which is attached to the carrier, and the guide member, will cause the animal suspended from the carrier to be diverted around the processing station.

When such diversion is desired, the apparatus according to the invention allows a control organ positioned along the path to adjust the coupling means of the carrier of the animal that is to be excluded such that the sideways extending arm connected to this carrier positions at right angles to the conveyor's path. Conveniently, each carrier is provided with two arms extending substantially sideways and in each other's extended direction. In this way, the number of adjustments to the coupling means required to be carried out can be limited.

A simple embodiment of the apparatus according to the invention is characterized in that the arm guiding member is embodied as a bar which begins and ends near the path traveled by each carrier, and which bar between its two ends deflects away from this path of travel. In this manner, the path of the arm-guiding member causes the arm, and the carrier coupled thereto, to be diverted outside the path of the conveyor to circumvent the processing station in the desired manner. Desirably, the arm or arms are curved in order to allow the arm or arms to readily follow the path of the arm-guiding member.

It is known that the carriers may be provided with hook-like receiving means for the legs of the slaughtered animals. In this embodiment, it is desirable in a further aspect of the invention that the receiving means of carriers suspended substantially vertically only have an opening which is directed upward. This prevents the animal falling out of the carrier when the carrier is diverted around the respective processing station.

In yet another aspect of the invention, the apparatus is provided with a guard member to prevent the coupling means from twisting, which guard member is in operation during the advancement of the arm-guiding member. The advantage with this is that if, due to the contact between arm and arm guiding member, a twisting torque is exerted on the carrier, this will meet with resistance so that the animal will be conveyed past the processing station as desired.

An embodiment is known in which the coupling means are substantially rectangular with flat side edges. The guard member may then be simply embodied as a guide rail which is mounted closely to the path of a side edge of the coupling means in the vicinity of the arm-guiding member. Desirably, the guide rail extends substantially at least along the starting section of the arm-guiding member.

BRIEF DESCRIPTION OF THE DRAWINGS

The invention will now be elucidated with reference to the drawings, which in in the FIGS. 1 to 5, show a top view of the apparatus according to the invention in the vicinity of the arm-guiding member;

in the FIGS. 6A and 6B, show a view along the path of the conveyor near the beginning of the arm guiding member with an animal suspended from the carrier, one is to be guided through the processing station and one is to be diverted around the processing station, respectively; and in the FIGS. 7 and 8 show a: view along the path of the conveyor with an animal suspended from the carrier, one has been guided through the processing station and one has been diverted around the processing station, respectively.

Identical reference numbers in the Figures refer to similar parts.

DETAILED DESCRIPTION

Figure 4:
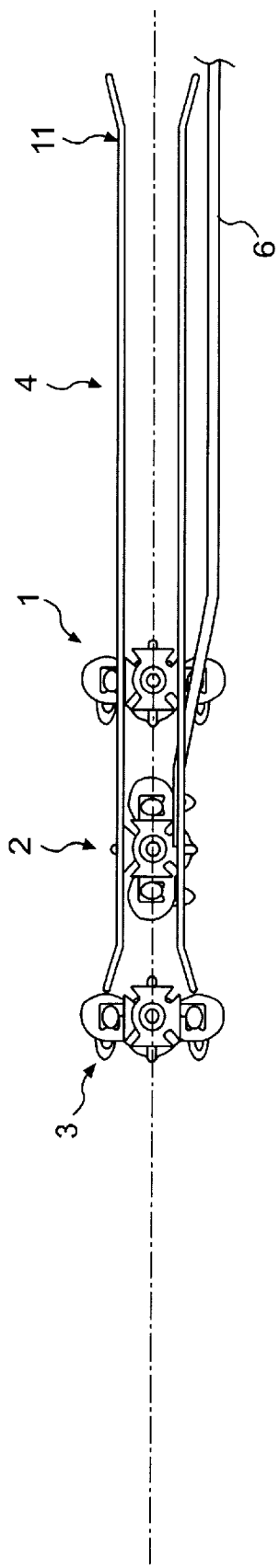

Reference will now be made in detail to one or more embodiments of the invention, as shown in the drawings. Each example is provided by way of explanation of the invention, and not meant as a limitation of the invention. It is intended that the present invention include modifications and variations to the embodiments shown and described herein.

With reference first to FIG. 1, a starting position is shown of three successive carriers 1, 2, and 3 with suspended slaughtered poultry. Said carriers 1, 2, and 3 are to be guided past a processing station (not shown) which is positioned in the path of travel generally indicated with reference number 4. For example, it has been determined by an inspection station that the poultry suspended from carrier 2 is not to be guided through the processing station in the path 4, but is to be diverted around it.

FIG. 2 illustrates that for this purpose the carrier 2 has to undergo an adjustment in the course of the conveyor's path of travel. This is completed in FIG. 3. Both the carrier 1 and the carrier 3 convey an animal whose regular processing in the processing station has to take place at reference number 4. Consequently, said carriers 1 and 3 are not adjusted and proceed undisturbed.

Figure 5:
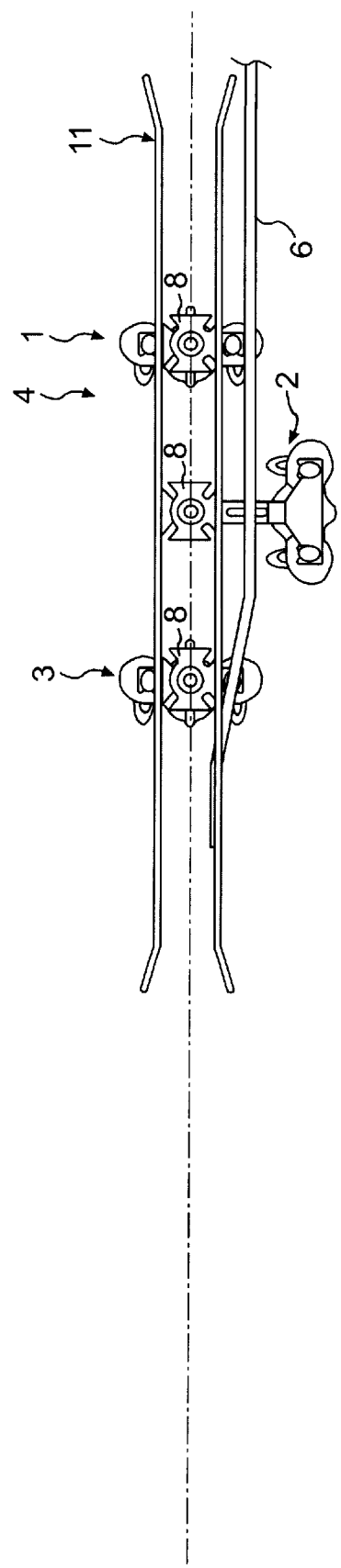

FIGS. 4 and 5 show that the carriers 1 and 3 with the suspended animals are guided through the processing station at reference number 4 while, as may be clearly seen in FIG. 5, the carrier 2 with the suspended animal is at reference number 4 diverted around the processing station.

With further reference now to the FIGS. 6A, 6B, 7 and 8, it is shown that each carrier 1, 2 and 3 is provided with a substantially sideways extending arm 5. Also shown in these Figures is the guide member 6, which can actually be seen more clearly in the FIGS. 1 to 5. This arm guiding member 6 is equipped to cooperate with the arm 5 connected to each carrier 1, 2, and 3 for diverting an animal suspended from the carrier 2 around the processing station 4. This is clearly shown in FIG. 6B with regard to the beginning of the arm-guiding member 6, and in FIG. 8, with regard to its middle portion. When the arm 5 and the arm-guiding member 6 are to cooperate in this manner, the carrier 2 is adjusted such that the arm 5 is placed at right angles in relation to the path of the conveyor 7, as explained above with reference to FIGS. 1 to 5. This is carried out in a manner totally familiar to the person skilled in the art requiring no further explanation, with the aid of coupling means 8, to which the carriers 1, 2, 3 are attached and by means of a control organ (not shown) for said coupling means 8, positioned along the path of travel. The FIGS. 6B and 8 further clearly show that each carrier is preferably provided with two such arms 5 extending substantially sideways in each other's extended direction.

With reference again to the FIGS. 1 to 5, it is shown that the arm-guiding member 6 is embodied as a bar which begins and ends near the path traveled by each carrier 1, 2, 3, and that this arm-guiding member between its two ends deflects away from this path. The FIGS. 6A, 6B, 7 and 8 a further show that said arm-guiding member 6, is directed vertically upward at an angle, and in this connection, that the arms 5 are curved. The latter-named Figures further show that the carriers 1, 2, 3 are provided with the hook-like receiving means 9 for the legs of the slaughtered animals, with the receiving means 9 of carriers hanging substantially vertically, as shown in the FIGS. 6A, 6B, and 7, only having an opening 10 which is directed upward. The result is that when the carrier 2 is adjusted sideways as shown in FIG. 8, the animal suspended therefrom will not fall out of the carrier 2, which after passing the processing station 4 can be returned with the suspended bird to the path of the other carriers 1 and 3.

In the FIGS. 1 to 5, it can be seen that the coupling means 8 are embodied substantially rectangular and are provided with flat side edges. A further aspect of the invention is that a guard member 11 is used to prevent the coupling means 8 from twisting. This guard member is embodied as a guide rail 11 mounted closely along the side edge of the coupling means 8, which side edge is directed sideways in relation to the direction of conveyance. Said guide rail 11, one or two of which may be present at either side of the path of the coupling means 8, extends over a distance corresponding at least with the starting section of the arm guiding member.

What is claimed is:

1. An apparatus for conveying slaughtered animals along a conveying path and through a processing station, said apparatus comprising:

a plurality of carriers connected to a conveyor by respective rotatable connecting devices such that said carriers are rotatable about a vertical axis between a first position wherein said carrier conveys the animal at a first orientation through the processing station, and a second position wherein the animal is turned to a second orientation and diverted from the processing station as said carrier is conveyed therepast;

each said carrier including at least one protruding arm member, said arm member substantially aligned with said conveying path in said first position of said carrier, and extending substantially transverse to said conveying path in said second position of said carrier;

a guide member extending along at least a portion of said conveyor adjacent the processing station; and wherein said guide member is disposed to engage said arm members of any said carriers rotated to said second position, said guide member shaped so as to move said carriers to a position such that the animal carried by said carrier is diverted from the processing station as said carrier is conveyed therepast and said arm member is engaged by said guide member.

2. The apparatus as in claim 1, wherein said carriers are configured for conveying slaughtered poultry.

3. The apparatus as in claim 1, wherein said carriers include at least two said arm members extending opposite from each other in generally the same plane.

4. The apparatus as in claim 3, wherein at least one of said arms is curved.

5. The apparatus as in claim 1, wherein said guide member comprises a bar extending generally parallel to said conveyor along said portion adjacent the processing station.

6. The apparatus as in claim 1, wherein said carriers comprise receiving devices having an upwardly directed opening for engaging the slaughtered animal.

7. The apparatus as in claim 1, further comprising a guard member disposed along said conveying path generally adjacent said guide member and with a beginning end located upstream of said guide member and downstream of a location where said carriers are rotated from said first position to said second position, said guide member disposed so as to contact and prevent said coupling devices from rotating as said carriers are conveyed past said processing station.

8. The apparatus as in claim 7, wherein said coupling devices comprise a substantially square or rectangular shape, and said guard member comprises at least one rail disposed so as to engage a flat side of said coupling devices.

9. The apparatus as in claim 8, wherein said guard member comprises spaced apart rails defining a channel through which said coupling devices are conveyed.

* * * * *